US008045421B2

(12) United States Patent
Harley, Jr.

(10) Patent No.: US 8,045,421 B2
(45) Date of Patent: Oct. 25, 2011

(54) WATCH WITH PLANAR LIGHT DIFFUSION CHANNEL

(75) Inventor: Richard D. Harley, Jr., Portland, OR (US)

(73) Assignee: Nike, Inc., Beaverton, OR (US)

(*) Notice: Subject to any disclaimer, the term of this patent is extended or adjusted under 35 U.S.C. 154(b) by 0 days.

(21) Appl. No.: 12/015,996

(22) Filed: Jan. 17, 2008

(65) Prior Publication Data

US 2009/0185458 A1 Jul. 23, 2009

(51) Int. Cl.
*G04B 19/30* (2006.01)
*G01D 11/28* (2006.01)

(52) U.S. Cl. .......................................... 368/227; 362/29

(58) Field of Classification Search .................. 368/227; 362/29–30, 97.1

See application file for complete search history.

(56) References Cited

U.S. PATENT DOCUMENTS

| | | | | | |
|---|---|---|---|---|---|
| 2,823,512 | A * | 2/1958 | Le Van | 368/226 |
| 4,247,928 | A * | 1/1981 | Dorfman | 368/67 |
| 4,705,407 | A * | 11/1987 | Brien | 368/227 |
| 5,040,098 | A * | 8/1991 | Tanaka et al. | 362/634 |
| 5,390,085 | A * | 2/1995 | Mari-Roca et al. | 362/609 |
| 5,703,837 | A * | 12/1997 | Umemoto et al. | 368/88 |
| 5,943,299 | A * | 8/1999 | Genta | 368/28 |
| 5,984,485 | A * | 11/1999 | Poli et al. | 362/26 |
| 6,806,644 | B2 * | 10/2004 | Ueno et al. | 313/512 |
| 6,979,094 | B1 * | 12/2005 | Venkatram | 362/23 |
| 7,095,463 | B2 * | 8/2006 | Usui et al. | 349/61 |
| 2004/0174774 | A1 * | 9/2004 | Tasaka et al. | 368/84 |
| 2009/0185304 | A1 * | 7/2009 | Harley, Jr. | 359/894 |

* cited by examiner

*Primary Examiner* — Sean Kayes
(74) *Attorney, Agent, or Firm* — Banner & Witcoff, Ltd.

(57) ABSTRACT

Structures are disclosed that can improve the visibility of instrument displays. With some implementations, an instrument is provided with an illumination system having a light source and a light diffusion device proximal to the light source. The light diffusion device has at least one surface parallel to a primary plane of the display of the instrument. When the light source is activated, light propagates through the light diffusion device toward the display of the instrument.

27 Claims, 3 Drawing Sheets

WATCH WITH PLANAR LIGHT DIFFUSION CHANNEL

FIELD OF THE INVENTION

The present invention relates to structures for improving the visibility of instruments, such as wristwatches, other wrist-borne devices, portable electronic devices, and the like. Various examples of the invention may be particularly applicable to the illumination of an instrument's display.

BACKGROUND OF THE INVENTION

A variety of instruments are commonly used in modern society. Many adults, for example, will wear some type of wristwatch. Many people also will frequently wear or carry portable electronic devices, such as wireless telephones, digital music players, and personal digital assistants (PDAs). Still other types of instruments, such as pedometers, compasses, and satellite positioning devices, may be carried by individuals, e.g., during athletic activities, such as running, hiking, boating, and biking. Typically, these instruments include a mechanism, a display, and a transparent crystal or lens covering the display. With analog displays, the display often will have a dial and one or more hands that move relative to the display. Additionally or alternatively, some types of analog displays may have one or more moving dials that move below an aperture in a stationary upper dial.

The usefulness of most instruments, however, is limited by their visibility. For example, if the instrument has poor or no illumination, then the instrument cannot be viewed in low light. To improve visibility in low light, some instrument makers may include a light source, use luminescent material on the display, or both. A single light source often will illuminate only a small portion of the instrument display (e.g., that closest to the light source), however, while the use of multiple light sources typically is relatively expensive. On the other hand, most luminescent materials, such as tritium, still require some type of ambient light in order to be seen, and therefore, may not adequately function in long term, low light conditions.

SUMMARY

Various aspects of this invention relate to structures that can improve the visibility of instrument displays. According to some examples of the invention, an instrument display is provided with a light system having a light source and a light diffusion device proximal to the light source. The light diffusion device may have at least one surface parallel to a primary plane of the display. For example, if the display has hands rotating above a dial, the light diffusion device may have an upper surface facing the hands, so that light from the light source is diffused by the light diffusion device toward the hands (and to backlight the hands). With some variations of the invention, the light diffusion device may be located underneath the dial (e.g., if the dial or portions thereof are transparent or translucent, if the dial is smaller than the light diffusion device plane, etc.). In still other variations of the invention, however, the light diffusion device may be located between the dial and the hands or the light diffusion device may itself provide display elements and/or function as at least a portion of the dial. With such arrangements, light is distributed over an entire area of the display, so that the entirety of the display can be viewed in low light conditions.

BRIEF DESCRIPTION OF THE DRAWINGS

A more complete understanding of the present invention and at least some features and advantages thereof may be acquired by referring to the following description and the accompanying drawings, in which like reference numbers indicate like features throughout, and wherein.

Figure 1:
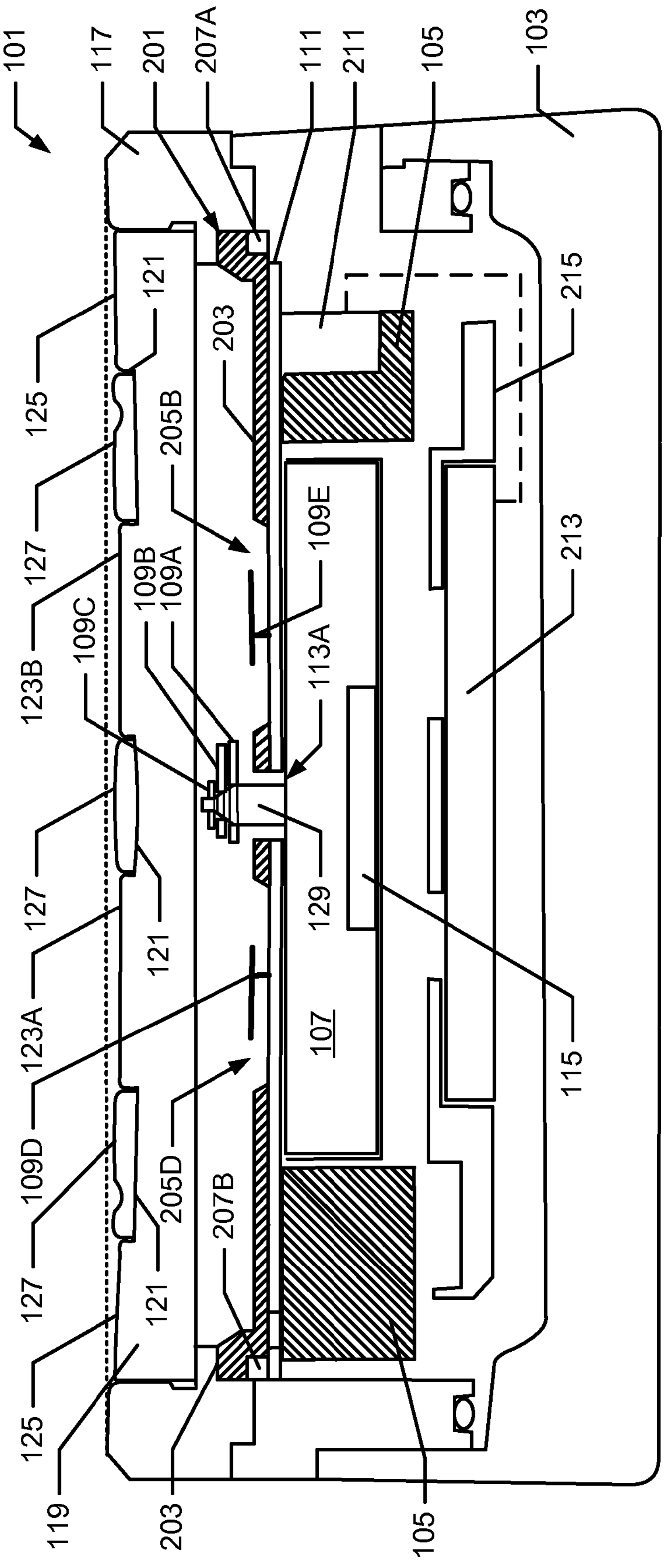
FIG. 1 illustrates a cross-section of an example watch or other instrument according to the invention.

The reader is advised that the drawings do not necessarily illustrate all of the elements of an instrument and/or the various features of the instrument to scale.

DETAILED DESCRIPTION

I. General Description of Watches and Other Instruments in Accordance with Examples of the Invention In the following description of various example structures in accordance with the invention, reference is made to the accompanying drawings, which form a part hereof, and in which are shown by way of illustration various example instrument assemblies in accordance with the invention. Additionally, it is to be understood that other specific arrangements of parts and structures may be utilized, and structural and functional modifications may be made without departing from the scope of the present invention. Also, while the terms "top," "bottom," "front," "back," "rear," "side," "underside," "overhead," and the like may be used in this specification to describe various example features and elements of the invention, these terms are used herein as a matter of convenience, e.g., based on the example orientations shown in the figures and/or the orientations in typical use. Nothing in this specification should be construed as requiring a specific three dimensional or spatial orientation of structures in order to fall within the scope of this invention.

Aspects of this invention relate to watches and other instruments that include a display panel, such as pedometers, compasses, GPS devices, telephones, PDAs, and other wrist-borne instruments or other portable electronic devices. In at least some examples of this invention, such instruments may include: (a) a portion of an instrument display oriented substantially parallel to a plane; (b) a light source; and (c) a light diffusion device (optionally disk shaped) arranged proximal to the light source and having at least one surface parallel to the plane, wherein light from the light source is diffused by the light diffusion device toward the portion of the instrument display. As another example, instruments in accordance with at least some examples of this invention may include: (a) a casing optionally defining a battery compartment and/or a compartment for housing at least some portions of the instrument's operational structures; (b) an instrument mechanism mounted in the casing; (c) a first light source electrically coupled to receive power from a battery provided in the battery compartment; (d) a light diffusion device (optionally disk shaped) located proximal to the first light source and having at least one substantially planar surface; (e) an instrument display, wherein light from the first light source is diffused by the light diffusion device toward the instrument display; (f) optionally, a second light source electrically coupled to receive power from a battery provided in the battery compartment, wherein light from the second light source is diffused by the light diffusion device toward the instrument display; and/or (g) optionally, a plate located between the battery compartment and the light diffusion device or between the light diffusion device and the instrument display, wherein the plate includes one or more markings that form a second instrument display.

The instrument display(s) may include any desired type of display elements, such as one or more instrument hands arranged to extend substantially parallel to the plane; an LCD, LED, or other electronic display device; a dial element; chronograph hands or dials; numbers or letters (e.g., stationary or provided on a movable mechanism); hour, minute, or second markings; etc. If desired, at least some of these markings or other features of the instrument display or display elements may be marked on the light diffusion device (e.g., on a major surface thereof, embedded therein, etc.); may be marked on a cover plate for the casing or another plate provided in the instrument construction (optionally, on either side of the light diffusion device); may be provided as separate elements or structures engaged with the diffusion device, plate, or casing; etc.

The light diffusion device may include one or more passages defined therethrough, e.g., to allow connection stems, pinions, or other mechanisms for the watch (or other device) to connect to the instrument mechanism and to be driven. As a more specific example, such passages or apertures may be provided, for example, to allow a connection stem to pass through the light diffusion device and connect to a drive mechanism (e.g., a watch movement device) to drive the hour, minute, and/or second hands of a watch. As another example, such passages or apertures may be provided to allow pinions for a chronographic element to connect to a drive mechanism therefor. As another example, if desired, such passages may allow a clear and unobstructed view of underlying dials, numbers, or other markings. As yet another example, such passages may allow space for mounting a magnifying lens, e.g., to provide an enlarged view of underlying indicators or other structures.

Additionally or alternatively, if desired, a transparent lens may be positioned on a side of the one or more instrument hands opposite the light diffusion device (e.g., attached to or provided as part of the watch crystal, located between the display and the crystal, etc.). The lens may allow some portion of the instrument display (e.g., a chronograph dial, markings for the chronograph display element(s), a numerical date indicator, etc.) to appear enlarged for easier user viewing.

Specific examples of instrument structures according to this invention are described in more detail below. The reader should understand that these specific examples are set forth merely to illustrate examples of the invention, and they should not be construed as limiting the invention.

II. Specific Examples of Watches and Other Instruments in Accordance with this Invention

A. The Instrument Assembly

Figure 2:
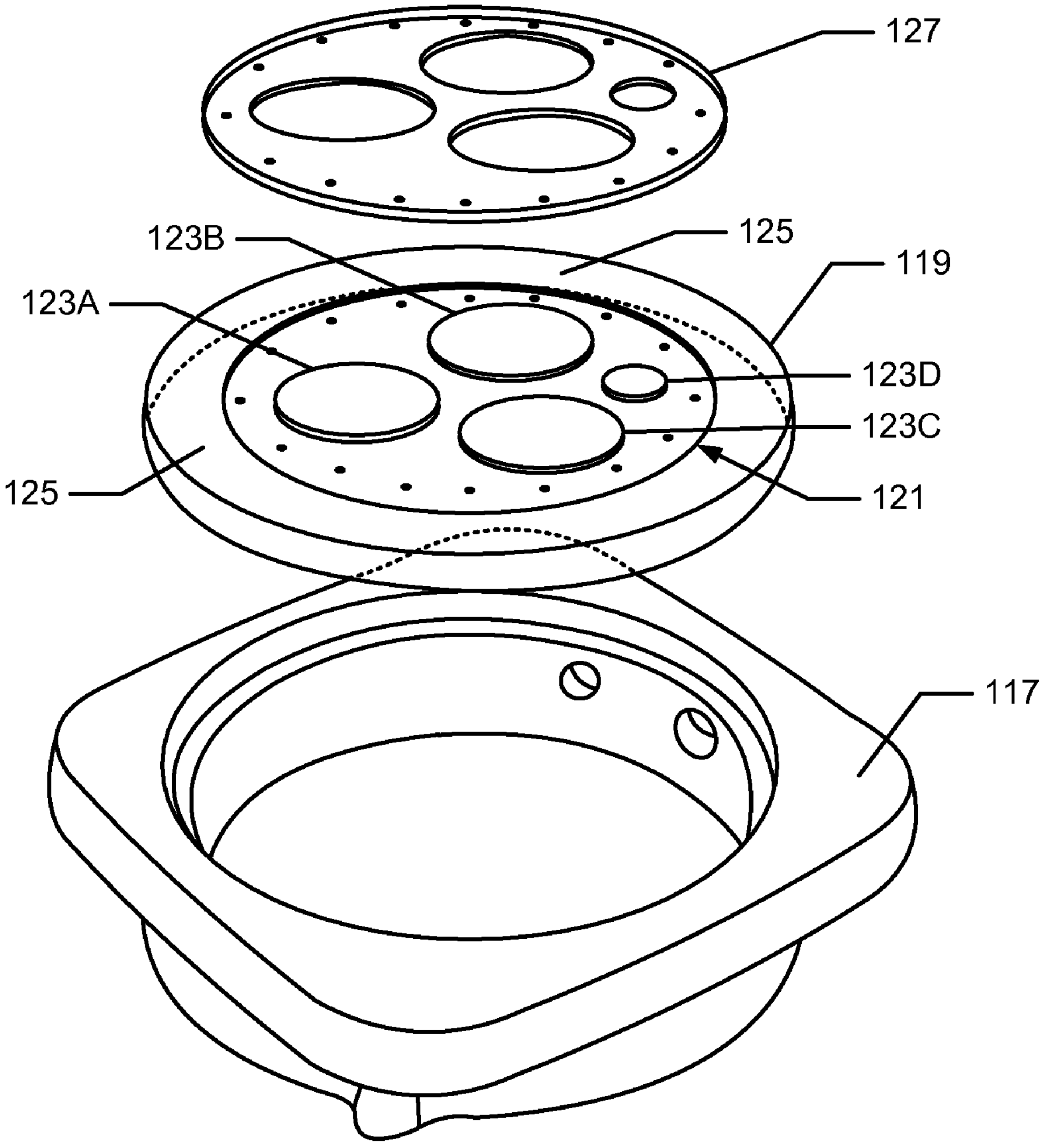
FIG. 2 illustrates a perspective exploded view of an example crystal and bezel structure for an example instrument according to the invention.
Figure 3:
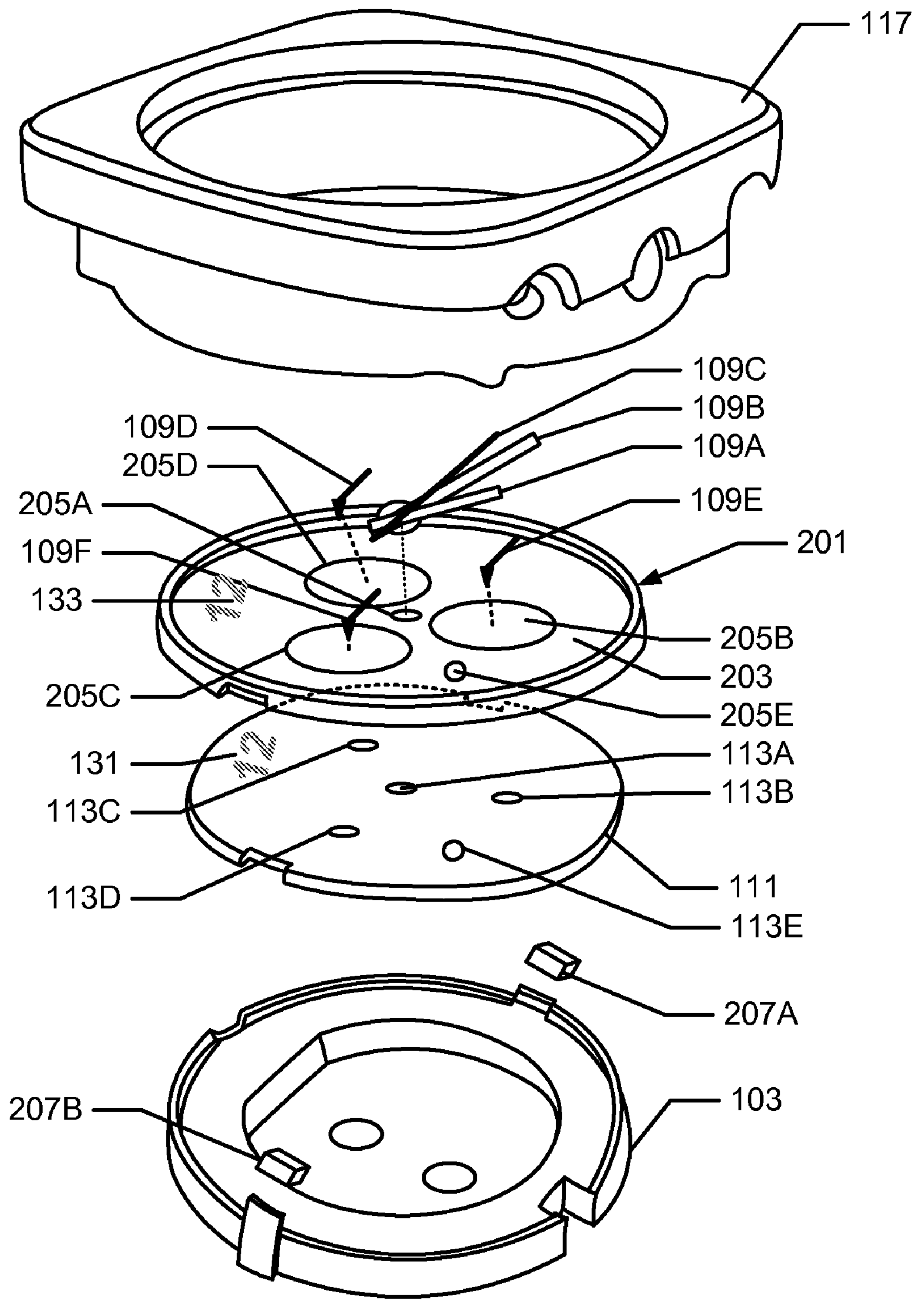
FIG. 3 illustrates a perspective exploded view of an illumination system for an example instrument according to the invention.

FIG. 1 illustrates an example of a watch 101 that may be implemented according to various examples of the present invention. FIG. 2 illustrates an example crystal structure for such an instrument 101, and FIG. 3 illustrates an example illumination system for such an instrument. As seen in these figures, the watch 101 includes a casing 103, a movement holder 105, and a movement 107. With this illustrated example, the watch 101 provides an analog display. Accordingly, the movement 107 in this example structure 101 drives one or more pinions to rotate a plurality of hands 109. The watch 101 of this example structure includes three longer hands, namely: an hour hand 109A, a minute hand 109B, and a second hand 109C. The watch 101 of this example structure also includes three smaller chronographic hands, namely: an hour hand 109D, a minute hand 109E, and a second hand 109F. Any desired number of hands or other display indicating elements, and/or combinations of such hands or other elements, for any desired functions or combinations of functions, may be provided in a watch or other instrument structure 101 without departing from this invention.

As is well known in the art, the movement 107 rotates the hour hand 109A so that it makes one complete revolution every 12 hours, and it rotates the hour hand 109D one complete revolution every 24 hours to indicate the elapse of hours. Similarly, the movement 107 rotates the minute hands 109B and 109E so each makes one complete revolution every hour to indicate the elapse of minutes in an hour. The movement 107 also rotates the second hands 109C and 109F so that each makes one complete revolution every minute, to indicate the elapse of seconds in a minute. Conventionally, the movement 107 continuously drives the hands 109A, 109B and 109F. The movement 107 also may be designed and structured to start and stop the operation of the hands 109C, 109D and 109E in response to input from a user. In accordance with at least some examples of the invention, the movement 107 also may provide a date counter (not shown) that increments one value every 24 hour period, to indicate the passage of days in a month. Other arrangements and functions also are possible.

A movement case cover 111 is provided over the movement holder 105. The movement case cover 111 protects the movement 107 from dust, debris and, with various examples of the invention, moisture. The movement case cover 111 defines apertures 113A-113D, each corresponding to a pinion or connection stem (e.g., connection stem 129 in FIG. 1) that drives one of the hands 109. Thus, the pinion or connection stem for each of the hands 109 passes through a corresponding aperture 113A-113D to rotate its corresponding hand 109. The movement case cover 111 of this example structure 101 also defines an aperture 113E, corresponding to a date counter. In some examples of the invention, a date indicator simply may be viewed through the aperture 113E. With still other examples of the invention, however, the date counter (when present) may have a raised portion that extends through the aperture 113E or some other desired structure.

The movement case cover 111 may be formed of any desired material, such as brass. With some implementations of the invention, the surface of the movement case cover 111 that faces the hands 109 (i.e., the upper surface in FIGS. 1 and 3) may have a reflective appearance, as will be discussed in more detail below. With still other examples of the invention, the surface of the movement case cover 111 that faces the hands 109 may be painted, etched, and/or otherwise marked (or modified) to display indicators (e.g., indicator 131 in FIG. 3), as also will be discussed in more detail below.

With the illustrated implementation of the invention, the movement 107 is an electronic movement, such as a quartz movement. Accordingly, the watch 101 also includes a battery 115 for powering the operation of the movement 107. With alternate examples of the invention, however, the movement 107 may be a mechanical movement that operates using an arrangement of springs and gears to store and release kinetic energy. A variety of both quartz and mechanical movements are well known in the art, and thus will not be detail in more detail here.

The watch 101 also includes a bezel 117, which in turn holds a crystal 119. The bezel 117 may be formed of a relatively hard material that will resist scratching and gouging, such as hard plastic or resin, aluminum, steel, titanium, or other metal. The bezel 117 also may be formed of a flexible material that will compress before registering a scratch or gouge, such as rubber. If desired, the bezel 117 may form a part of the case 103 and/or it may be removably mounted to other portions of the watch structure 101 (e.g., to allow removal and replacement, e.g., when damaged, for personalization/customization purposes, etc.), by mechanical connectors or in any other desired manner. The bezel 117 also may include indicia thereon, such as trademarks or logos, design elements, instrument display markings to convey information to the user (such as scales, numbers, letters, hour markings, minute markings, etc.), etc.

The crystal 119 may be formed of any desired transparent or semi-transparent material, such as sapphire, glass, clear acrylic, or clear polycarbonate. In the illustrated example of the invention, the crystal 119 is secured in the bezel 117 by an adhesive. With still other implementations of the invention, however, the crystal 119 may be secured in the bezel 117 by any desired means, such as by flanges, by threads, by welding, by press-fitting, etc. Optionally, an O-ring or gasket may be provided around the junction of the bezel 117 and the crystal 119, e.g., to help prevent moisture or water from entering the instrument casing 103 via this junction.

In the illustrated example of the invention, the crystal 119 has a circular shape. With still other examples of the invention, however, the crystal 119 may have any desired shape, such as a rectangular, square, oval or irregular shape.

The surface of the crystal 119 facing away from the hands 109 is concave in this structure 101, so that it does not extend past the surface of the bezel 117 facing away from the hands 109 (note the broken straight and planar line in FIG. 1, which helps to illustrate the overall concave nature of the top surface of the crystal 119). Further, and as also illustrated in FIG. 2, the surface of the crystal 119 facing away from the hands 109 may have a topography that defines at least one recess 121. With this illustrated example of the invention, the recess(es) 121 is (are) defined so that four non-recessed circular areas 123 remain in the central part of the crystal 119. As seen in FIGS. 1 and 2, the non-recessed circular areas 123A and 123B correspond to the area traversed by a chronometer hands 109D and 109E, respectively. The third non-recessed circular area 123C corresponds to the area traversed by a chronometer hand 109F, while the fourth non-recessed circular area 123D corresponds to the aperture 205E in the light diffusion device 203 and the aperture 113E in the movement cover 111 (e.g., for viewing the date counter). The recess(es) 121 is (are) defined so that the crystal 119 also has a non-recessed, ring-shaped area 125 encircling the perimeter of the crystal 119. This non-recessed ring-shaped area 125 corresponds to an area of the display traversed by the ends of the hands 109A-109C.

The watch 101 of this example structure also includes a crystal guard 127, e.g., formed as a protective plate. The shape of the crystal guard 127 may be selected so as to generally match the shape of the recess 121, e.g., so that the guard 127 defines a plurality of recesses or openings corresponding to the non-recessed areas 123 in the crystal 119. Further, the guard 127 is positioned within the recess 121. As seen in FIG. 1, however, the height of the guard 127 is taller than the depth of the recess 121. Accordingly, the surface of the guard 127 facing away from the hands 109 (that is, the upper surface of the guard 127 as shown in FIGS. 1 and 2) extends beyond the upper surface of the crystal 119. Like the bezel 117, the guard 127 may be formed of a relatively hard material that will resist scratching and gouging, such as hard plastic or resin (optionally a transparent material), aluminum, steel, titanium, or other metal. The guard 127 also may be formed of a flexible material that will compress before registering a scratch or gouge, such as rubber. These features can help protect the crystal 119 from damage.

It should be appreciated that, while the illustrated example of the invention has only a single guard 127, still other examples of the invention may employ multiple guards 127 that fit into the one or more recesses 121. Still further, as noted above, some implementations of the invention may have a crystal 119 with multiple recesses 121. One or more guards 127 can then be inserted into each recess. With the illustrated example of the invention, the guard 127 is fixed into the recess 121 of the crystal 119 using an adhesive. It should be appreciated, however, that other embodiments of the invention may employ any desired technique to fix the guard 127 into the recess 121. For example, the crystal 119 may be co-molded onto the guard 127 so that the guard 127 defines the recess 121 when the crystal is formed, the guard 127 may be press-fit or friction fit into the recess 121, retaining structures may be provided to hold the guard 127 in the recess, mechanical connectors may hold the guard 127 with respect to the recess 121, etc.

If desired, the crystal guard 127 (or at least portions thereof) may be removably mounted to the crystal 119, e.g., to allow removal and/or replacement, for example, when damaged, for personalization/customization purposes, etc. The crystal guard 127 may include indicia thereon, such as trademarks or logos, design elements, instrument display markings to convey information to the user (such as scales, numbers, letters, words, hour markings, minute markings, etc.), etc.

B. Illumination System

FIGS. 1 and 3 also illustrate an illumination system 201 that can be implemented according to various examples of the invention. The illumination system 201 of this example structure 101 includes a light diffusion device 203 defining a plurality of apertures 205 and two light sources 207. As seen in these figures, the light diffusion device 203 is positioned between the movement 107 and the hands 109. With the illustrated example of the invention, the light diffusion device 203 is formed as a generally circular disk or plate, having a major surface that faces the hands 109 (i.e., the upper surface in FIGS. 1 and 3) and a major surface that faces the movement 107 (i.e., the lower surface in FIGS. 1 and 3). This light diffusion device 203 also has one or more minor side surfaces that may be arranged to extend between the major surfaces, e.g., substantially orthogonal to the surface that faces the hands 109. The side surface(s) may produce a raised ledge appearance, as shown in FIGS. 1 and 3.

As previously noted, the light diffusion device 203 of this example structure 101 defines five separate apertures 205A-205E. The aperture 205A allows the pinions driving the hands 109A-109C to pass through the light diffusion device 203 (see connection stem 129 in FIG. 1), while the apertures 205B-205D provide space for the rotation of the chronographic hands 109D-109F. With some examples of the invention, the aperture 205E provides open and unobstructed viewing of a date counter. For implementations of the invention where the date counter has a raised portion, the aperture 205E may allow the raised portion of the date counter to extend into or through the light diffusion device 203.

With various implementations of the invention, the light diffusion device 203 is formed of a transparent or semi-transparent material that diffuses incident light. For example, the light diffusion device 203 may be formed of glass, acrylic, or a polycarbonate material, such as an optically-enhanced polycarbonate material. As will be discussed in more detail below, the surface of the light diffusion device 203 that faces the movement 107 may be formed with a varying topography, like a grating. As will also be discussed in more detail below, one or more surfaces of the light diffusion device 203 may be painted, etched, or otherwise marked to display indicators (see indicator 133 in FIG. 3). Such light diffusing polycarbonate materials are known and are commercially available.

With the illustrated implementation of the invention, light sources 207 are positioned on opposite sides of the light diffusion device 203. More particularly, a first light source 207A is positioned on one side of the light diffusion device 203 adjacent a minor surface oriented generally orthogonal to the surface that faces the hands 109. A second light source 207B is positioned on an opposite side of the light diffusion device 203, also adjacent a minor surface oriented generally orthogonal to the surface that faces the hands 109. It should be appreciated, however, that alternate embodiments of the invention may employ one or three or more light sources 207. Also, one or more light sources 207 may alternately or additionally be placed adjacent to the lower surface of the diffusion device 203 (that is, the surface that that faces the movement 107).

With the illustrated example of the invention, the lights sources 207 are light emitting diodes controlled through a printed circuit board 211. The light sources 207 are powered by a light source battery 213 positioned in light source battery holder 215. Of course, with alternate examples of the invention, the light sources 207 may be or may include any desired type of light emitting device, such as incandescent lights, plasma displays, or organic light emitting devices (OLEDs). With some implementations of the invention, the light sources 207 may activate only in response to input from a user (e.g., by a button press or other switch activation action). For still other implementations of the invention, however, the light sources 207 may activate in response to any desired stimulus, such as movement or input from an ambient light detector, on a periodic basis, such as between the hours of 7:00 PM and 7:00 AM, or may be continuously operational.

When the light sources 207 emit light, the light enters into the light diffusion device 203 and is propagated throughout the diffusion device in a direction parallel to the surface that faces the hands 109. As the light propagates through the light diffusion device 203, the light is emitted from the surface that faces the hands 109, to thereby illuminate the hands 109 and the surrounding area (e.g., backlighting). If the diffusion device 203 covers a substantial amount of the area traversed by the hands 109, as shown in FIGS. 1 and 3, the light emitted from the light diffusion device 203 will evenly illuminate the entire area traversed by the hands 109.

As shown in FIGS. 1 and 3, the light diffusion device 203 may include one or more notched areas on its side surface(s) to receive the light source 207. This arrangement allows the light to be directly (and efficiently) introduced into the light diffusion device 203. Other arrangements are possible, however, without departing from this invention. For example, if desired, the light sources may be positioned at any desired location(s) in the overall instrument structure and "optically coupled" to the light diffusion device, e.g., using fiber optics, light pipes, or other light transmission systems. As another example, if desired, the light sources may be arranged at least partially beneath the light diffusion device 203 (and optionally transmit light into the light diffusion device 203 through its bottom surface). Other arrangements of the light sources with respect to the diffusion device or combinations of these arrangements also may be used without departing from this invention.

It should be appreciated that various structural features can be implemented with different embodiments of the invention to increase the amount of light emitted from the upper surface of the light diffusion device 203 (that is, the surface that faces the hands 109). For example, as previously noted, the lower surface of the light diffusion device 203 can be formed with a varying topography. Depending upon the shape of the topography, the lower surface of the light diffusion device 203 may act as a diffraction grating to reflect light propagating in the light diffusion device 203 toward its upper surface. Still further, with various examples of the invention, the light diffusion device 203 may be formed with smaller and/or fewer apertures, or with no apertures at all. As yet another example, if desired, portions of the diffusion device 203 may be masked so as to allow light to be emitted therefrom only at selected locations.

In some example structures in accordance with this invention, the torque provided by the movement 111 to the chronographic hands 109D-109F can be increased, thereby allowing the pinions rotating the hands 109D-109F to be lengthened and the hands 109D-109F to be positioned well above the upper surface of the light diffusion device 203. In such arrangements, the apertures 205B-205D can be reduced in size so as to have only the minimum diameter required to fit the pinions. With other embodiments of the invention, the light diffusion device 203 may define a recess around each aperture 205B-205D to allow for rotation of the hands 109D-109F. As another alternative, if the hands 109D-109F are positioned sufficiently well above the upper surface of the light diffusion device 203, the light diffusion device 203 may avoid any recesses. Reducing the area of the apertures will increase the propagation of light through the light diffusion device 203 and more evenly distribute the light emitted from the surface of the light diffusion device 203 that faces the hands 109.

Alternately or additionally, the upper surface of the movement case cover 111 (or at least a portion thereof) may be formed of a reflective material. The upper surface of the movement case cover 111 will then reflect light emitted from the light diffusion device 203 back into the light diffusion device 203 and toward its upper surface. With some examples of the invention, a separate reflective material may be interposed (e.g., as a separate element) between the upper surface of the movement case cover 111 and the lower surface of the light diffusion device 203. As yet an additional example, if desired, the movement case cover 111 can be omitted (e.g., and the light diffusion device 203 may act as this cover).

In some embodiments of the invention, indicators 133 may be painted, etched, or otherwise marked or mounted on the light diffusion device 203, e.g., to form or partially form a dial or other display indicator. More particularly, indicia for determining the status of the instrument (e.g., a relative time or elapsed time indicated by the watch 101) can be marked on the surface of the light diffusion device 203 that faces the movement 107, on the surface of the light diffusion device 203 that faces the hands 109, embedded within the light diffusion device 203 itself, or some combination thereof (shown generally at reference number 133 in FIG. 3). Alternately or additionally, if desired, one or more indicators or other indicia 131 can be painted, etched, or otherwise marked or mounted on the surface of the movement case cover 111 that faces the hands 109, so that these indicators can be viewed through the light diffusion device 203. Still further, indicia for determining the status of the instrument (e.g., a relative time or elapsed time indicated by the watch 101) can be marked on the surface of the crystal 119 that faces away from the hands 109, on the surface of the crystal 119 that faces toward the hands 109, embedded within the crystal 119 itself, or some combination thereof. As yet additional examples, if desired, an indicator plate or dial may be provided below the diffusion device 203 or above the light diffusion device 203 (and below the hands, e.g., if this plate or dial is transparent or translucent, or at least mostly transparent or translucent) so that light from the diffusion device illuminates or backlights indicia included on the plate. With such arrangements, these indicia can easily be viewed when the light diffusion device 203 diffuses light from the light sources 207.

As another example implementation of the invention, hour, minute, and second indicators (for the primary minute hand 109B, the primary second hand 109C, the chronographic hour hand 109D, the chronographic minute hand 109E, and the chronographic second hand 109F) may be printed on the surface of the crystal 119 that faces the hands 109, to provide a gauge or scale for motion of the hands 109A-109C. Indicators for the primary hour hand 109A, such as hour numbers "3", "6", "9", and "12", and an indicator arc (e.g., connecting the hour numbers "12" and "3") may be marked on the surface of the surface of the light diffusion device 203 that faces the hands 109. Still further, supplemental indicators may be marked on the surface of the bezel 117 that faces away from the hands 109 and/or the surface of the crystal guard 127 (if any) that faces away from the hands 109 to provide a further gauge or scale for motion of the hands 109D-109F. Thus, as the various hands 109 rotate on their respective pinions, they pass over or by corresponding indicia on the light diffusion device 203, the crystal 119, the crystal guard 127, and/or the bezel 117 to show the passage of time and/or to provide information to the user. Together, the hands 109 and the indicia formed by the indicators make up the display for the watch 101.

It should be noted that the arrangement of the indicia on different portions of the watch 101 may be selected to determine which indicia will be visible under certain conditions. For example, by placing the hour numbers "3", "6", "9", and "12" and the indicator arc on the surface of the light diffusion device 203 facing the hands 109, these indicia may be made so as to be relatively invisible when the light diffusion device 203 is not diffusing light from the light sources 207. When the light sources 207 are activated, however, and their light is diffused through the light diffusion device 203, these indicia may become more visible along with any indicia included on the crystal 119 or other locations. Of course, it will be appreciated that multiple light diffusion devices 203, together with one or more associated light sources 207, can be stacked or otherwise layered to allow various indicia to be viewed under different circumstances.

III. Conclusion

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

What is claimed is:

1. An instrument, comprising:

a first portion of an instrument display oriented substantially parallel to a plane;

at least two light sources; and a light diffusion device having at least a first surface parallel to the plane and at least one side angled with respect to the plane, the at least one side extending entirely around the first surface, wherein the at least two light sources are positioned proximal to the at least one side of the light diffusion device, and wherein light from the at least two light sources is diffused by the light diffusion device and propagates through said first surface parallel to the plane to backlight the first portion of the instrument display, wherein the light diffusion device further includes a second surface opposite the first surface, wherein the first portion of the instrument display is located proximal to the first surface, and wherein the plate is positioned proximal to the second surface, and wherein the at least one side surface extends between the first surface and the second surface.

2. The instrument recited in claim 1, wherein the first portion of the instrument display includes one or more instrument hands arranged substantially parallel to the plane.

3. The instrument recited in claim 2, wherein the light diffusion device includes a passage defined therethrough.

4. The instrument recited in claim 3, further comprising:

an instrument mechanism adjacent a second surface of the light diffusion device opposite the first surface; and a connection stem passing through the passage defined in the light diffusion device and connecting the instrument mechanism to the one or more instrument hands.

5. The instrument recited in claim 2, further comprising one or more markings on the light diffusion device that form a second portion of the instrument display.

6. The instrument recited in claim 5, wherein at least one of the one or more markings is located on the first surface of the light diffusion device facing toward the first portion of the instrument display.

7. The instrument recited in claim 5, wherein at least one of the one or more markings is embedded in the light diffusion device facing toward the first portion of the instrument display.

8. The instrument recited in claim 2, further comprising one or more markings on a plate that form a second portion of the instrument display.

9. The instrument recited in claim 1, wherein the first portion of the instrument display includes an electronic imaging device.

10. The instrument recited in claim 9, wherein the electronic imaging device is a liquid crystal display.

11. The instrument recited in claim 1, wherein the light diffusion device has a disc shape.

12. The instrument recited in claim 1, wherein the light diffusion device further includes a second surface opposite the first surface, wherein the first portion of the instrument display is located proximal to the first surface, and the instrument further comprises:

an instrument mechanism that controls the first portion of the instrument display, the instrument mechanism being positioned proximal to the second surface of the light diffusion device.

13. The instrument recited in claim 1, wherein the instrument is a watch.

14. The instrument recited in claim 1, wherein the at least two light sources comprises a first light source and a second light source, and wherein the first light source and the second light source are located on opposite sides of the light diffusion device.

15. The instrument recited in claim 1, wherein the at least one side of the light diffusion device is perpendicular to the plane.

16. The instrument of claim 1, wherein the light diffusion device includes a plurality of apertures formed therein.

17. The instrument of claim 16, wherein the apertures are formed in the first surface of the light diffusion device.

18. An instrument, comprising:

an instrument mechanism;

a first light source and a second light source electrically coupled to receive power from a battery;

a light diffusion device having a first substantially planar surface and at least one side angled with respect to the first substantially planar surface, the at least one side extending entirely around the first substantially planar surface, wherein the first light source and the second light source are located proximal to the at least one side of the light diffusion device, the light diffusion device further including a second substantially planar surface and the at least one side extending from the first substantially planar surface to the second substantially planar surface; and an instrument display controlled by the instrument mechanism, wherein light from at least one of the first light source and the second light source is diffused by the light diffusion device and propagates through the first substantially planar surface to backlight the instrument display.

19. The instrument recited in claim 18, wherein the instrument display includes one or more instrument hands arranged substantially parallel to the first substantially planar surface of the light diffusion device.

20. The instrument recited in claim 19, wherein the light diffusion device includes a passage defined therethrough, and wherein the instrument further comprises a connection stem passing through the passage defined in the light diffusion device and connecting the instrument mechanism to the one or more instrument hands.

21. The instrument recited in claim 18, wherein the light diffusion device includes one or more markings that form a second instrument display.

22. The instrument recited in claim 18, further comprising:

a plate located adjacent to the light diffusion device, wherein the plate includes one or more markings that form a second instrument display.

23. The instrument recited in claim 18, wherein the instrument display includes a liquid crystal display system.

24. The instrument recited in claim 18, wherein the light diffusion device has a disc shape.

25. The instrument recited in claim 18, wherein the instrument is a watch.

26. The instrument recited in claim 18, wherein the first light source and the second light source are located on opposite sides of the light diffusion device.

27. The instrument recited in claim 18, wherein the at least one side is perpendicular to the first substantially planar surface.

* * * * *